Nov. 11, 1958  B. F. ZIEGLER, JR  2,860,229
ELECTRIC FRY PAN

Filed May 7, 1957  2 Sheets-Sheet 1

Nov. 11, 1958 B. F. ZIEGLER, JR 2,860,229
ELECTRIC FRY PAN
Filed May 7, 1957 2 Sheets-Sheet 2
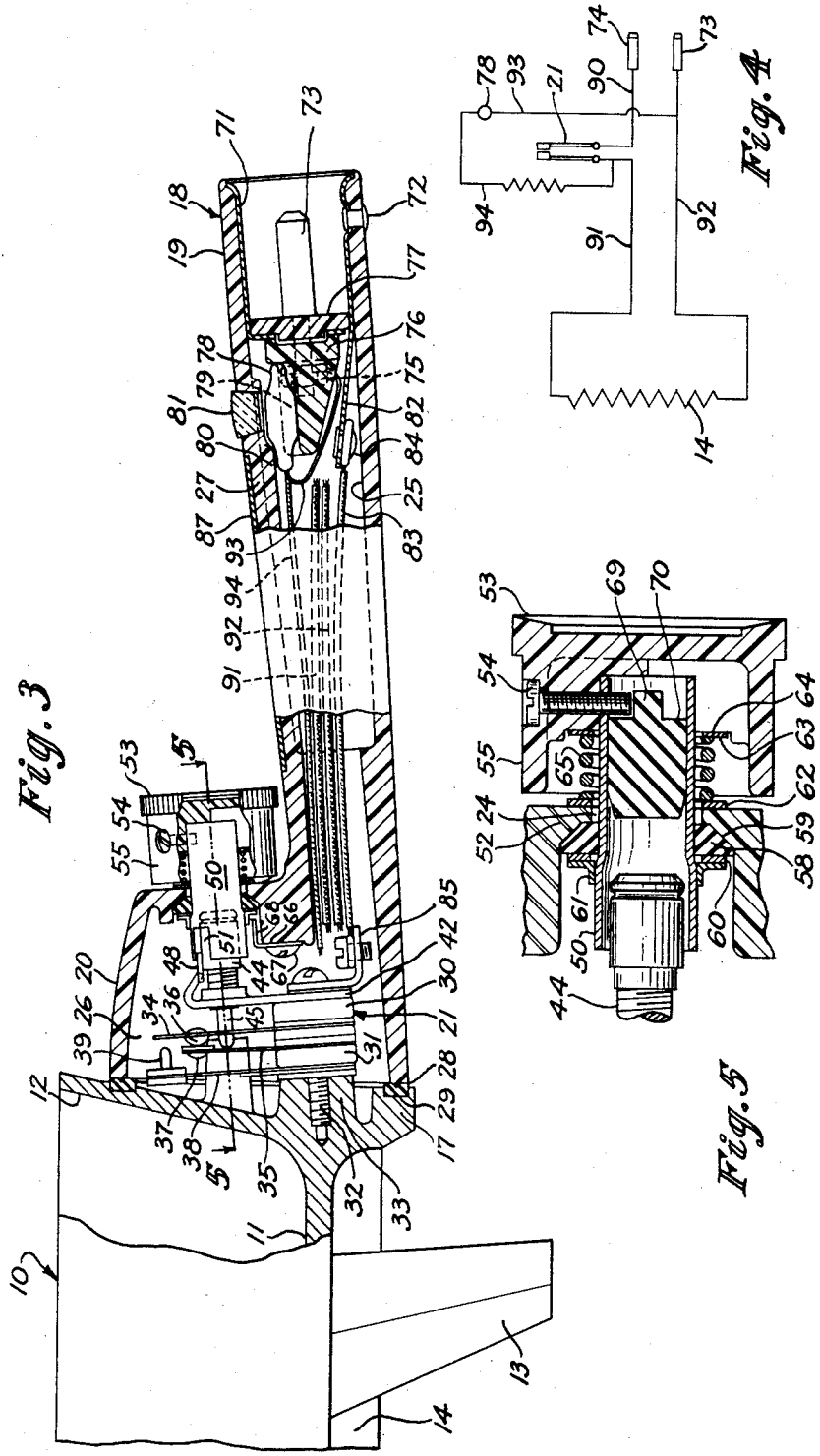

United States Patent Office 2,860,229
Patented Nov. 11, 1958

2,860,229
ELECTRIC FRY PAN

Brandt F. Ziegler, Jr., Canton, Ohio, assignor to The Hoover Company, North Canton, Ohio, a corporation of Ohio Application May 7, 1957, Serial No. 657,586

4 Claims. (Cl. 219—44)

The present invention relates to portable electrical fry pans and more particularly to an arrangement of the switch and electrical conductors in the fry pan handle.

An object of the invention is to provide a portable fry pan with a handle having a hand grip for the electrical conductors and an upwardly projecting housing between the hand grip and the pan body to enclose a thermostat having its control dial positioned above a portion of the hand grip. Another object is to provide a fry pan having electrical connections in its handle sealed against the entrance of water so that the pan may be immersed for washing. Other objects and advantages of the invention will become apparent from the following description and drawings wherein:

Figure 3 is a longitudinal section through the fry pan handle, Figure 4 is a wiring diagram, and Figure 5 is a section along line 5—5 in Figure 3.

Figure 1:
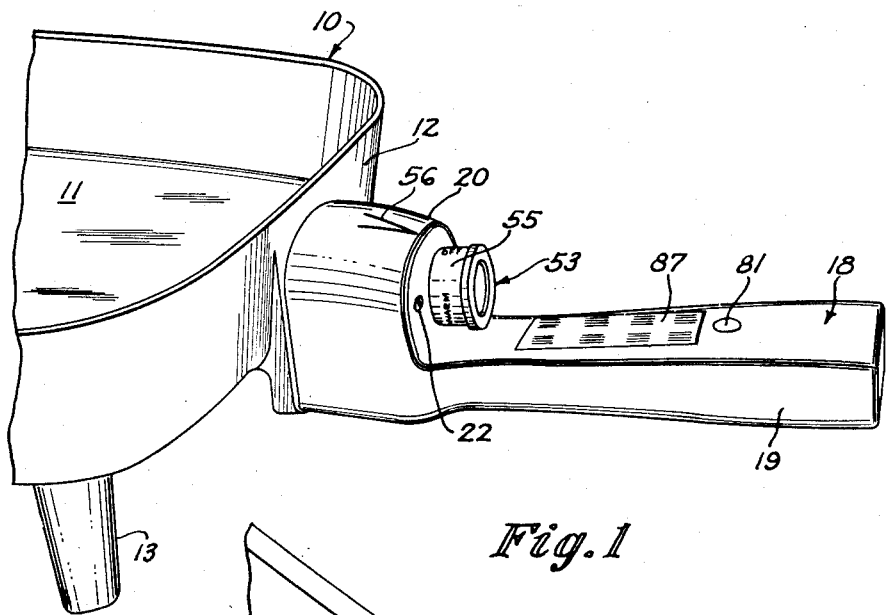
Figure 1 is a perspective view of a fry pan.
Figure 2:
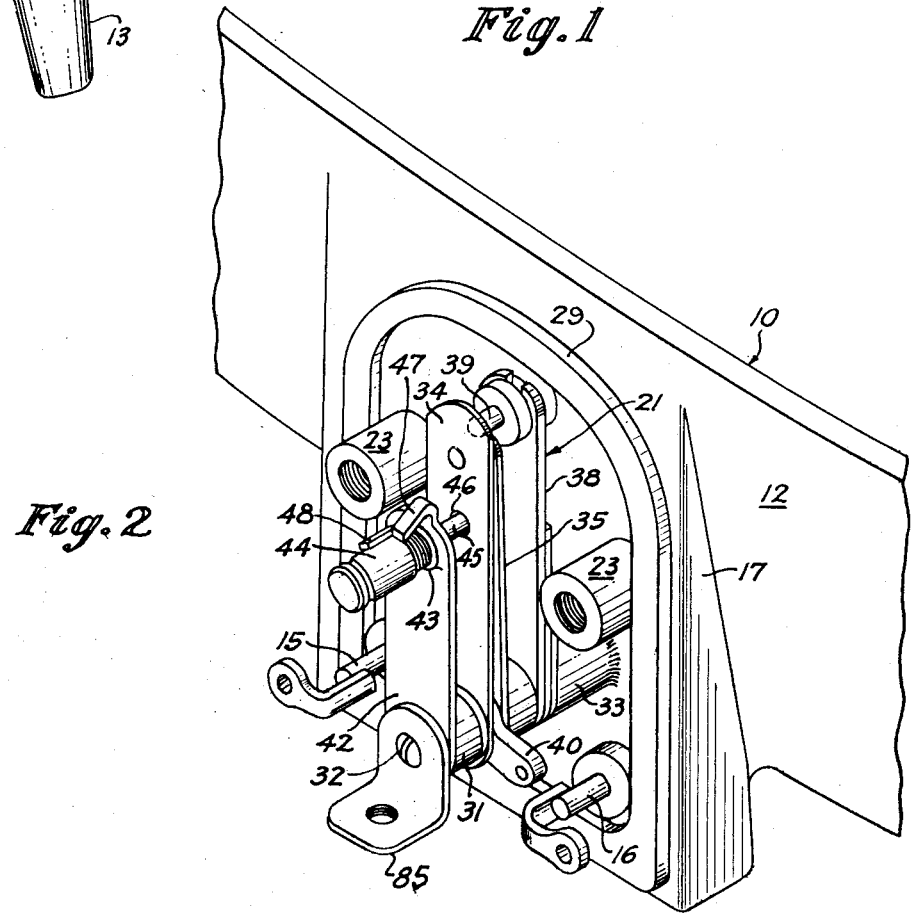
Figure 2 is an enlarged perspective view with the handle removed and showing the thermostat mounted on the wall of the pan.

The embodiment of the invention herein disclosed comprises a cast aluminum fry pan body 10 having a flat bottom 11, an annular side wall 12 and a plurality of supporting legs 13. A heating element 14 is cast in the bottom wall 11 and its terminals 15, 16 project through a land 17 formed on the side wall 12. A handle 18, formed of heat insulating material, has a hand grip portion 19 and an enlarged housing 20 for a thermostat switch 21, and is secured to the pan 12 by a pair of bolts 22 threaded into bosses 23 projecting from the side wall within the land 17. Interposed between the inner edge 28 of the handle 18 and a groove in the land 17 is a sealing gasket 29 of heat resistant material and the latter is compressed when the bolts 22 are threaded into the bosses 23 to thereby provide a water tight joint. The interior of the handle 18 includes a tubular portion 25 within the hand grip 19 and a thermostat chamber 26 formed by the housing 20 which is interposed between the tubular section 25 and the land 17 and projects above the top wall 27 of the hand grip 19.

The thermostat 21 comprises a supporting post 30 formed of a plurality of insulating washers 31 secured to the pan by a screw 32 threaded into a boss 33 on the side wall 12. A pair of spring switch arms 34 and 35 are supported between the washers 31 and carry contacts 36 and 37 which are biased into engagement with each other. A bimetallic element 38 provided with an insulated tip 39 is also supported on the post 30 and rests against the boss 33 to respond to the temperature of the fry pan body 10. Each of the switch arms 34, 35 is provided with a terminal 40 adjacent the post 30 for connection to the heating element and a source of current. The free ends of the switch arms 34, 35 and the bimetal 38 project upwardly into the thermostat chamber 26 above the top wall 27 of the hand grip 17.

Secured to the post 30 is a supporting bracket 42 which projects into the chamber 26 and is provided with a threaded sleeve 43 receiving an adjusting screw 44 having a reduced end 45 passing through an opening 46 in the switch arm 34 into contact with the arm 35. Cooperating lugs 47 and 48 are provided on the supporting bracket 42 and the adjusting screw 44 whereby the latter is restricted in its rotation to less than 360°.

Telescoped about the screw 44 is a sleeve 50 having a marginal slot 51 which cooperates with the lug 48 to rotate the screw 44. The sleeve 50 projects through an opening 24 in the wall 52 of the housing 20 and overlies the top wall 27 of the hand grip 19. An adjusting knob 53 is attached to the sleeve 50 by a screw 54 and is provided along its peripheral surface 55 with indicia representing different temperatures of the pan 10 when arranged opposite an arrow 56 on the housing 20.

The temperature desired in the pan 10 is obtained by rotating the knob 53 relative to the arrow 56 causing the screw 44 to separate the contacts 36, 37 and the end 45 of the screw holds the contact 37 in adjusted fixed position. Upon a rise in temperature in the pan 10 heat will be transmitted to the boss 33 and then to the bimetallic element 38 and cause it to flex to the right as viewed in Figure 3, whereby the pin 39 engages the end of the spring arm 34 and moves it to the right to separate the contacts 36, 37 and interrupt flow of current to the heating element 14. The bimetallic element 38 will then start to cool and flex to the left whereby the contacts 36, 37 will again reengage and supply current to the heating element 14 to thereby maintain the fry pan 10 at a predetermined temperature.

Disposed in the opening 24 about the sleeve 50 is a gasket 58 having a conically shaped portion 59 which seats against a complemental surface in the housing wall 52. Along the inner surface of the gasket 58 is a washer 60 which bears against an L-shaped ring 61 welded to the sleeve 50. A washer 62 bears against the housing wall 52 and another washer 63 is seated against a shoulder 64 on the knob 53, and disposed between the washers 62, 63 is a spring 65 which urges the sleeve 50 to the right and compresses the gasket 58 against the conical surface of the opening 51 in the housing wall 52 and also against the sleeve 50 to provide a water tight seal between the latter and the wall 52. A bracket 66 is arranged within the chamber 26 and is attached by a bolt 67 to the handle 18 and has an off-set portion 68 adapted to engage the L-shaped ring 61 to prevent displacement of the sleeve 50 inwardly of the housing 20 during assembly of the spring 65 about the sleeve 50. Leakage of water between the adjusting knob 53 and the interior of the adjusting sleeve 50 is prevented by a sealing plug 69 of heat resistant material driven into the sleeve and retained therein by the screw 54 projecting along a shoulder 70 on the plug 69.

Arranged within the outer end of the hand grip 19 is a metal shroud 71 secured to the handle by a rivet 72. A pair of male contact pins 73, 74 are secured by nuts 75 to the inner end of the shroud and are insulated from the latter by members 76 and 77. A signal lamp 78 seats in a cradle 79 formed on the insulating member 76 and is held in place by a rib 80 on the interior of the hand grip 19. A lens 81 is cemented in an opening on the hand grip 19 and is arranged opposite the lamp 78 for viewing the latter to determine when the lamp is energized. Projecting from the shroud 71 is a metal extension 82 to which one end of a ground conductor 83 is attached by a rivet 84 and the opposite end of the conductor is secured to a bracket 85 attached to the post 30 by the bolt 32 to thereby provide a ground connection between the thermostat and shroud 71. A plate 87 is secured to the handle top wall 27 and is inscribed with instructions to inform the user of the proper temperature setting for cooking various foods.

The electrical circuit disclosed in Figure 4 comprises the male conductor pin 74 connected by a wire 90 to the thermostat switch 21 and then through a conductor 91 to the heating element 14 and thence by a conductor 92 to the male prong 73. The lamp 78 is connected by a wire 93 to the prong 73 and to the thermostat switch 21 by a conductor 94 whereby the lamp 78 is energized when the contacts 36, 37 are closed and the heating element 14 is in circuit.

In operation the user first determines the proper setting for cooking the desired foods from the instructions on the plate 87 and turns the knob 53 from its "off" position to the proper cooking temperature. The bimetallic element 38 will oscillate to close and open the contacts 36, 37 to maintain the pan at its proper cooking temperature. After the food is removed the pan may be immersed in a cleaning solution to a point short of the male prongs 73, 74 without the danger of the solution entering the interior of the handle 18 and damaging the electrical controls.

From the foregoing it will be perceived that the user may rest her hand on the grip 19 and while so placed adjust the knob 53 with the thumb and forefinger to the desired temperature setting. In addition since the thermostat adjusting sleeve 50 does not extend throughout the length of the handle grip bore 25, the ground wire 83 and the conductors 90 and 92 may be attached to the thermostat 21 and then fed through the bore 25 prior to securing the handle to the fry pan 10. Thereafter the conductors may be connected to the male prongs 73, 74 and the shroud 71 riveted to the handle 18, and the bore 25 accommodates the slack in the conductors upon attachment of the shroud 71. Also prior to securing the handle to the fry pan body 10 the thermostat sleeve 50 is attached to the handle 18 by the bracket 66, the control knob 53 to the sleeve 50, and the spring 65 inserted between the knob 53 and the wall 52 of the projecting housing 20 whereby the spring 65 then compresses the gasket 58 to provide a water tight seal between the sleeve 50 and the wall of the opening 24.

While I have shown and described but one embodiment of my invention, it is to be understood that this embodiment is to be taken as illustrative only and not in a limiting sense. I do not wish to be limited to the particular structure shown and described but to include all equivalent variations except as limited by the scope of the claims.

I claim:
1. An electrically heated fry pan comprising a pan body having a side wall, an electric heating element associated with said body, a switch mounted on said body connected to said heating element and having an adjusting element, a handle having its inner end attached to said side wall, said handle having an elongated portion to provide a hand grip, said handle having a hollow housing projecting above said hand grip and interposed between the latter and said pan side wall, means defining an opening in the wall of said housing above said hand grip, said switch arranged within said handle and having its contacts projecting into said hollow housing, a control shaft connected to said adjusting element within said housing and projecting through said opening in the direction of said hand grip, and a knob secured to the projecting end of said control shaft exteriorly of said housing and positioned above said hand grip for manipulation by the operator to control said switch, and means securing said control shaft in said housing wall opening prior to attachment of said handle to said body side wall.

2. An electrically heated fry pan as described in claim 1, and said hand grip having an interior passageway extending from said housing to the outer end of said hand grip, electrical plug means in said passageway at said outer end of said hand grip adapted to be connected to a source of current, and electrical conductors disposed in said passageway and extending from said electrical plug to said switch in said hollow housing.

3. An electrically heated fry pan as described in claim 1, and sealing means at said housing opening and arranged about said control shaft to prevent entrance of liquid into said housing.

4. An electrically heated fry pan as described in claim 3, and a compression spring between said control knob and said housing wall for compressing said sealing means about said control shaft and the defining edge of said opening whereby said pan may be immersed up to said wall for cleaning.

References Cited in the file of this patent

UNITED STATES PATENTS

| 2,571,782 | Swenson | Oct. 16, 1951 |
| 2,744,995 | Jepson | May 8, 1956 |
| 2,823,293 | Levine | Feb. 11, 1958 |

FOREIGN PATENTS

| 664,113 | Great Britain | Jan. 2, 1952 |